(12) United States Patent  
Brito Da Costa et al.

(10) Patent No.: US 12,138,892 B2
(45) Date of Patent: Nov. 12, 2024

(54) COMPOSITE PANEL FOR STRUCTURAL AND DECORATIVE SURFACE

(71) Applicants: UNIVERSIDADE DO PORTO, Oporto (PT); INSTITUTO POLITÉCNICO DE VISEU, Viseu (PT); SURFORMA, S.A., Maia (PT)

(72) Inventors: Claudia Brito Da Costa, Antas Eps (PT); Ana João Tavares Da Silva Vinhas, Vila Nova di Gaia (PT); Jorge Manuel Santos Silva Martins, Lavra (PT); Luísa Maria Hora De Carvalho, Lavra (PT); Fernão Domingos De Montenegro Baptista Malheiro De Magalhães, Oporto (PT)

(73) Assignees: SURFORMA, S. A., Maia (PT); UNIVERSIDADE DO PORTO, Oporto (PT); INSTITUTO POLITÉCNICO DE VISEU, Viseu (PT)

( * ) Notice: Subject to any disclaimer, the term of this patent is extended or adjusted under 35 U.S.C. 154(b) by 329 days.

(21) Appl. No.: 17/607,127

(22) PCT Filed: Apr. 24, 2020

(86) PCT No.: PCT/IB2020/053879
§ 371 (c)(1),
(2) Date: Oct. 28, 2021

(87) PCT Pub. No.: WO2020/222098
PCT Pub. Date: Nov. 5, 2020

(65) Prior Publication Data
US 2022/0153003 A1 May 19, 2022

(30) Foreign Application Priority Data
Apr. 29, 2019 (PT) .......................... 115478

(51) Int. Cl.
B32B 27/20 (2006.01)
B32B 5/16 (2006.01)
(Continued)

(52) U.S. Cl.
CPC ................ *B32B 27/20* (2013.01); *B32B 5/16* (2013.01); *B32B 27/10* (2013.01); *B32B 27/40* (2013.01);
(Continued)

(58) Field of Classification Search
None
See application file for complete search history.

(56) References Cited

U.S. PATENT DOCUMENTS 5,468,539 A 11/1995 Crivelli
2003/0198775 A1 10/2003 Roth et al.
(Continued)

FOREIGN PATENT DOCUMENTS

WO 2006071920 A2 7/2006
WO WO-2017133804 A1 * 8/2017 ............ B32B 27/08
WO 20170152249 A1 9/2017

OTHER PUBLICATIONS

International Search Report of PCT/IB2020/053879 Mailed On Oct. 5, 2020.

*Primary Examiner* — Chinessa T. Golden
(74) *Attorney, Agent, or Firm* — Rivka Friedman

(57) ABSTRACT

The present invention is enclosed in the area of panels for structural and decorative surfaces, in particular panels containing polymer-based materials, suitable for the coating of surfaces, for example, and containing such polymer-based materials in the respective layers. The present invention may relate to the integration of polymer granules, recycled or unrecycled, being particularly relevant when the granules are obtained from end-of-life polymer-based materials, for (Continued)

instance obtained from car tires into the core of compact laminate boards. It is therefore an object of the present invention a composite panel (100) for structural and decorative surfaces wherein it comprises a core panel, the core panel (10) comprising a mixture of granules of a polymeric material and a bonding element (1), the bonding element providing for the bonding of the granules of a polymeric material.

15 Claims, 1 Drawing Sheet

(51) Int. Cl.
*B32B 27/10* (2006.01)
*B32B 27/40* (2006.01)

(52) U.S. Cl.
CPC . *B32B 2260/028* (2013.01); *B32B 2264/0207* (2013.01); *B32B 2264/1021* (2020.08); *B32B 2264/108* (2013.01); *B32B 2264/303* (2020.08); *B32B 2307/732* (2013.01); *B32B 2451/00* (2013.01)

(56) References Cited

U.S. PATENT DOCUMENTS

2006/0165950 A1   7/2006   Dodge, III
2012/0276348 A1   11/2012  Clausi et al.

\* cited by examiner

COMPOSITE PANEL FOR STRUCTURAL AND DECORATIVE SURFACE

FIELD OF THE INVENTION

The present invention is enclosed in the area of panels for structural and decorative surfaces, comprising the coating of surfaces, in particular panels containing polymer-based materials, suitable for the coating of surfaces or used as such, and containing such polymer-based materials in the respective layers.

The present invention may relate to the integration of polymer granules, recycled or unrecycled, being particularly relevant when the granules are obtained from end-of-life polymer-based materials, for instance obtained from car tires into the core of compact laminate boards.

PRIOR ART

The compacts currently produced in the industry are mainly composed of paper sheets impregnated with thermosetting phenolic resins, giving the pressed product excellent mechanical properties and impermeability. However, this type of materials may present shortage and thereby represents high associated costs. Being an over-engineered product for certain applications, it becomes necessary to obtain less costly/more available alternatives with differentiating properties. Such paper may consist of kraft paper.

Moreover, usage of paper, such as kraft paper, is significantly high in horizontal and vertical applications both for interior or exterior ambient panels, paper consisting of an element which is also hard to produce, leading to high economic and production costs.

The present solution innovatively overcomes such issues.

SUMMARY OF THE INVENTION

It is therefore an object of the present invention a composite panel for structural and decorative surfaces wherein it comprises a core panel, the core panel comprising a mixture of granules of a polymeric material and a bonding element, the bonding element providing for the bonding of the granules of a polymeric material. This type of panel gives rise to the opportunity to reuse granules obtained from end of life products, for example, or from scrap in the core of compacts in order to increase the portfolio of products made available industrially. In a particular example, the polymer granules may be obtained from rubber used in the production of tires, which is mixture of different rubbers (mainly styrene-butadiene rubber and natural rubber), fillers (mainly carbon black and silica) and other additives. This is available in the form of small granules (average 4 mm in diameter) from companies that recycle end-of-life tires. To produce the panel of the invention, the polymeric material granules are mixed with a bonding element, in order to obtain a cohesive and robust core.

In particular examples, the polymeric material granules may be obtained from the milling or extrusion into granules of a polymeric material product, from the scrap of a polymeric material product manufacturing. The polymeric material product may consist of a product which has reached its end of life, being subsequently milled for recycling by means of the present process. Preferably, the rubber product consists of rubber tires. For instance, the polymeric material granules comprise styrene-butadiene rubber and natural rubber, fillers and additives, the fillers preferably comprising carbon black and silica. Advantageously, the bonding element comprises, preferably consists of, a resin, the resin preferably comprising, preferably consisting of, a thermoplastic or thermosetting resin. In an inventive aspect of the panel of the present invention, the resin consists of a polyurethane pre-polymer. Besides providing strong binding, the PU pre-polymer also has attractive characteristics such as high moisture resistance, short curing times and no release of harmful volatile organic compounds, reinforcing the concept of a more eco-friendly and environmentally conscious production. Additionally, the polymeric material granules may have a diameter in the range of 0.1-7 mm preferably 2 mm.

It is also an object of the present invention the use of the composite panel of the present invention, in any of its described embodiments, in structural and decorative surfaces, preferably in floor panels, wall panels, ceiling panels, façade panels, decks or for the covering of automotive, aircraft, railway or naval vehicle part surfaces, more.

Correspondingly to the panel of the present invention, it is also an object of the present invention a method for obtaining a composite panel for structural and decorative surfaces comprising forming a core panel from a mixture of granules of a polymeric material and a bonding element, the bonding element providing for the bonding of the granules of a polymeric material. Such method may be implemented to obtain the composite panel of the present invention, in any of the described embodiments.

The panel solution of the present invention can be applied for floor panels, wall panels, ceiling panels, façade panels, decks or for the covering of automotive part surfaces, as well as in aircraft, railway or naval industries. More specifically, it is particularly suitable to be structural and decorative surfaces which have to be resistant to high moisture, such as walls, ceilings or floors of bathrooms, kitchens, locker rooms in public pools and schools, or others, in which prior art boards are over performing and require the use of more complex components.

DETAILED DESCRIPTION

Figure 1:
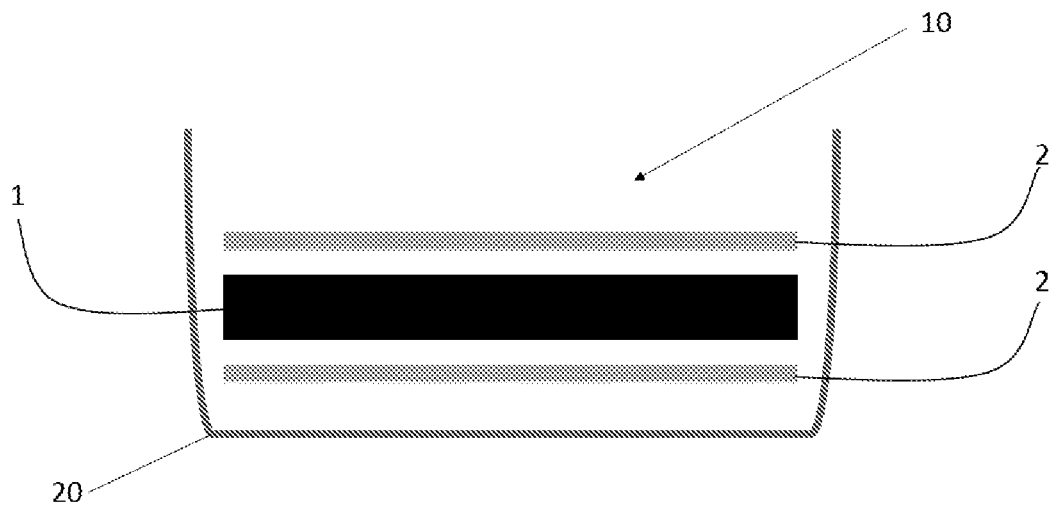
FIG. 1—representation of an embodiment of the core panel (10) of the panel for structural and decorative surfaces the present invention, in particular where it is used a layer obtained from the pressing of a mixture of granules of a polymeric material and a bonding element (1), in an aluminium shape (20), between two sheets of paper (2), wherein the paper preferably consists of kraft paper, more preferably dry or resin impregnated kraft paper.
Figure 2:
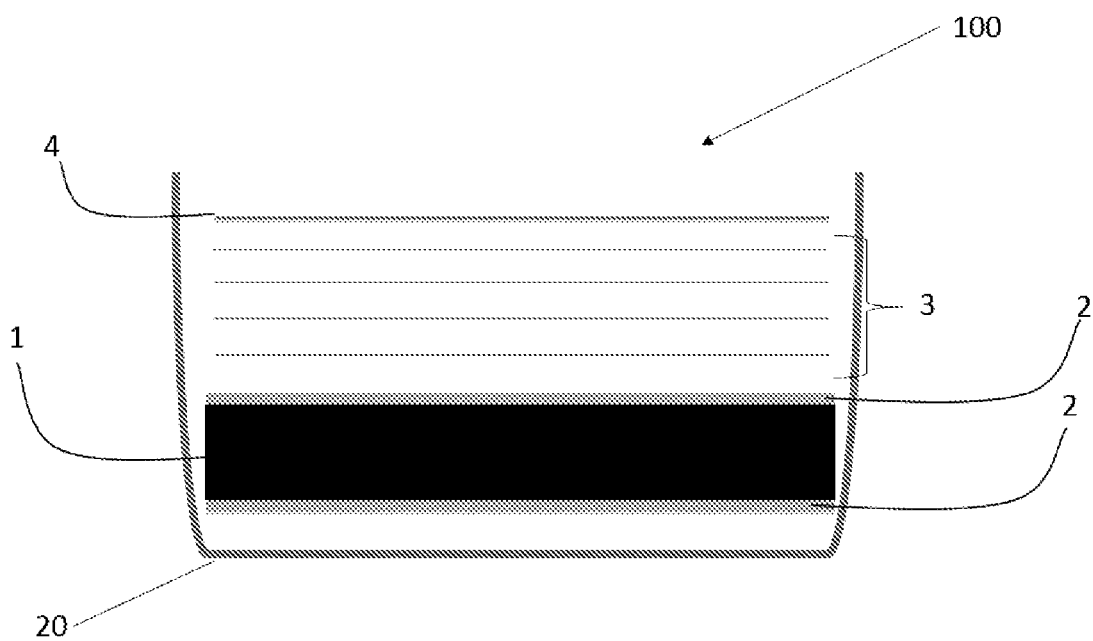
FIG. 2—representation of an embodiment of the panel (100) of the present invention, in particular where a high pressure laminated (HPL) layer with four additional sheets of paper (3), which are impregnated, and a décor paper layer is used, and pressed in a HPL fashion against the core panel (10), in an aluminium shape (20). The core panel (10) is in accordance with the core panel (10) of FIG. 1, wherein the paper preferably consists of kraft paper, more preferably dry or resin impregnated kraft paper.

The more general and advantageous configurations of the present invention are described in the Summary of the invention. Such configurations are detailed below in accordance with other advantageous and/or preferred embodiments of implementation of the present invention.

In an advantageous embodiment of the composite panel of the present invention, the core panel further comprises at least one sheet of paper (2) and the core panel is obtained from the pressing of the mixture of granules of a polymeric material and a bonding element (1) against the at least one sheet of paper (2). Since the use of paper—such as kraft paper—is highly diminished (from some dozens of sheets to less than ten, per compact, depending on the final thickness), and with this being the most expensive/less available raw material, the production cost/availability of this solution is very low when compared with standard ones. The reusing of a polymeric material or obtaining it from scrap is not only cheap but also highly available, since it's a material whose volumes are increasing each year, which needs to be reused in a sustainable way.

In another inventive aspect of the panel of the present invention, it comprises at least two sheets of paper (2), the core panel (10) being obtained from the pressing of the mixture of granules of a polymeric material and a bonding element (1) between the at least two sheets of paper (2). As previously referred, the panel of the present invention provides also for a highly suitable alternative as regards prior art solutions, as it enables a highly available alternative which, yet, maintains a high performance, in particular highly moisture resistant compacts, which are less engineered.

In yet another aspect of the panel of the present invention, it comprises at least two sheets of paper (2), the core panel (10) being obtained from the pressing of the mixture of granules of a polymeric material and a bonding element (1) between the at least two sheets of paper (2). Such solution provides the easening of an integration with additional layers for structural and decorative surfaces, namely décor layers for flooring or the covering of walls. Thus, preferably, the panel further comprises a décor layer (4). In particular, the pressing of the mixture of granules of a polymeric material and a bonding element (1) between the two sheets of paper (2) may advantageously be obtained when performed at a temperature of at least 90° C., optionally at a temperature of at least 120° C., optionally at a temperature of 140° C.

In an inventive aspect of the use of the panel of the present invention, the core panel (10) is further pressed with a high pressure laminate (HPL) layer on at least one face of the core panel (10), the HPL layer comprising the décor layer (4). In particular, the HPL layer may comprise at least two additional sheets of paper (3), the at least two additional sheets of paper (3) being arranged between the décor layer (4) and the core panel (10). Such provides for a suitable solution, which is resistant to high moisture. Preferably, the HPL layer has a thickness of 0.2 to 3 mm.

In order to enhance the resistance to high moisture, the at least two additional sheets of paper (3) and the décor paper are impregnated with a thermosetting or thermoplastic resin. Preferably, the HPL layer further comprises a plurality of overlay sheets, the overlay sheets being provided over the décor layer (4), the overlay sheets preferably consisting of overlay paper sheets.

Advantageously, wherein the décor layer (4) comprises, preferably consists of, decorative paper.

The core panel (10) is more advantageously obtained when the pressing of the mixture of granules of a polymeric material and a bonding element (1) against the at least one sheet of paper (2) is performed at a pressure between 20 and 100 bar.

The composite panel (100) is more advantageously obtained when the pressing of core panel (10) an HPL layer is performed at a pressure between 20 and 100 bar.

With regard to the embodiments of the composite panel comprising a core panel which in turn comprises at least one sheet of paper, the paper preferably consists of kraft paper, more preferably dry or resin impregnated kraft paper. The resin of the resin impregnated kraft paper preferably has a phenolic, melamine or other base.

As regards the method of the present invention, it may correspondingly further comprise the forming of a core panel by pressing the mixture of granules of a polymeric material and a bonding element (1) against at least one sheet of paper (2), preferably between two paper sheets, and thereby obtaining a core panel (10), and further arranging a décor layer (4) on such core panel (10). Additionally, it may further comprise the pressing of a high pressure laminate (HPL) layer against the core panel (10), the HPL layer comprising the décor layer (4) and at least two additional sheets of paper (3), the at least two additional sheets of paper (3) being arranged between the décor layer (4) and the core panel (10).

Moreover, the panel obtained from such method is more advantageously obtained when the pressure of the pressing of the mixture of granules of a polymeric material and a bonding element (1) against at least one sheet of paper (2) and/or the pressing of the HPL layer against the core panel (10) are within the range of 20-100 bar.

With regard to the embodiments of the method which involve at least one sheet of paper, the paper preferably consists of kraft paper, more preferably dry or resin impregnated kraft paper. The resin of the resin impregnated kraft paper preferably has a phenolic, melamine or other base.

As will be clear to one skilled in the art, the present invention should not be limited to the embodiments described herein, and a number of changes are possible which remain within the scope of the present invention.

Of course, the preferred embodiments shown above are combinable, in the different possible forms, being herein avoided the repetition all such combinations.

The invention claimed is:

1. A composite panel for structural and decorative surfaces wherein the composite panel comprises
   a core panel, a décor layer, and at least one sheet of paper, the core panel comprising a mixture of granules of a polymeric material and a bonding element, the bonding element providing bonding of the granules of the polymeric material,
   the mixture of granules of the polymeric material and the bonding element being pressed against the at least one sheet of paper, wherein:
   a polymeric material product or a scrap of a polymeric material product manufacturing being milled or extruded into granules of a polymeric material;
   the bonding element comprises a resin;
   the paper consists of dry or resin impregnated kraft paper; and
   at least one face of the core panel being pressed with a high pressure laminate (HPL) layer, the HPL comprising the décor layer.

2. A composite panel according to claim 1, wherein the polymeric material product is a product which has reached its end of life, the polymeric material product consisting rubber tyres.

3. A composite panel according to claim 2, wherein the polymeric material granules comprise styrene-butadiene rubber and natural rubber, fillers and additives.

4. A composite panel according to claim 3, wherein the polymeric material granules have a diameter in the range of 0.1-7 mm.

5. A composite panel according to claim 1, wherein the resin comprises a thermoplastic or thermosetting resin and, wherein the resin consists of a polyurethane pre-polymer.

6. A composite panel according to claim 1, wherein the core panel further comprises at least two sheets of paper, the core panel being obtained from pressing of the mixture of granules of the polymeric material and the bonding element between the at least two sheets of paper and, wherein the pressing of the mixture of granules of the polymeric material and the bonding element between the two sheets of paper is performed at a temperature of at least 90° C., or at a temperature of at least 120° C., or at a temperature of 140° C.

7. A composite panel according to claim 1, wherein the HPL layer comprises at least two additional sheets of paper, the at least two additional sheets of paper being arranged between the décor layer and the core panel,
and, wherein the at least two additional sheets of paper and the décor layer are impregnated with a thermosetting or thermoplastic resin.

8. A composite panel according to claim 1, wherein the HPL layer has a thickness of 0.2 mm to 3 mm.

9. A composite panel according to claim 1, wherein the HPL layer further comprises a plurality of overlay sheets, the overlay sheets being provided over the décor layer, the overlay sheets consisting of overlay paper sheets.

10. A composite panel according to claim 1, wherein the décor layer comprises a layer of decorative paper.

11. A composite panel according to claim 1, wherein pressing of the mixture of granules of the polymeric material and the bonding element against an at least one sheet of paper is performed at a pressure between 20 bar and 100 bar.

12. A composite panel according to claim 1, wherein the pressing of the core panel with the HPL layer is performed at a pressure between 20 bar and 100 bar.

13. A method for obtaining a composite panel for coating of a surface comprising forming a core panel from a mixture of granules of a polymeric material and a bonding element, the bonding element providing bonding of the granules of the polymeric material, wherein forming of the core panel is obtained by pressing the mixture of granules of the polymeric material and the bonding element against at least one sheet of paper and thereby obtaining the core panel, and further arranging a décor layer on such core panel, and the at least one sheet of paper consists of dry or resin impregnated kraft paper, the method further comprising pressing a high pressure laminate (HPL) layer against the core panel, the HPL comprising the décor layer.

14. A method according to claim 13, wherein the HPL layer comprises at least two additional sheets of paper, the at least two additional sheets of paper being arranged between the décor layer and the core panel.

15. A method according to claim 14, wherein a pressure of pressing of a mixture of granules of a polymeric material and a bonding element against at least one sheet of paper and/or pressing of the HPL layer against the core panel is within the range of 20-100 bar.

* * * * *